United States Patent
Saito et al.

(10) Patent No.: US 7,020,548 B2
(45) Date of Patent: Mar. 28, 2006

(54) VEHICLE DRIVE RECORDER

(75) Inventors: Atsushi Saito, Fujisawa (JP); Kozo Nakamura, Fujisawa (JP)

(73) Assignee: Hitachi Global Storage Technologies Japan, Ltd., Odawara (JP)

(*) Notice: Subject to any disclaimer, the term of this patent is extended or adjusted under 35 U.S.C. 154(b) by 0 days.

(21) Appl. No.: 10/651,607

(22) Filed: Aug. 29, 2003

(65) Prior Publication Data

US 2004/0138794 A1 Jul. 15, 2004

(30) Foreign Application Priority Data

Sep. 19, 2002 (JP) .............. 2002-272694

(51) Int. Cl.
*G06F 19/00* (2006.01)
(52) U.S. Cl. .................. 701/35; 340/438
(58) Field of Classification Search ........ 701/29, 701/35, 45–47; 340/438, 439; 280/735; 180/282

See application file for complete search history.

(56) References Cited

U.S. PATENT DOCUMENTS

| | | | |
|---|---|---|---|
| 5,446,659 A * | 8/1995 | Yamawaki ............ 701/29 |
| 5,847,472 A | 12/1998 | Byon | |
| 6,067,488 A * | 5/2000 | Tano ............ 701/35 |
| 6,185,490 B1 * | 2/2001 | Ferguson ............ 701/35 |
| 6,246,933 B1 * | 6/2001 | Bague ............ 701/35 |
| 6,298,290 B1 * | 10/2001 | Abe et al. ............ 701/35 |
| 6,389,340 B1 * | 5/2002 | Rayner ............ 701/35 |
| 6,630,884 B1 * | 10/2003 | Shanmugham ....... 340/436 |
| 6,636,791 B1 * | 10/2003 | Okada ............ 701/35 |
| 6,746,043 B1 * | 6/2004 | Ishida ............ 280/735 |
| 2002/0091474 A1 * | 7/2002 | Okada ............ 701/35 |
| 2002/0198640 A1 * | 12/2002 | Gehlot et al. ....... 701/35 |
| 2003/0168839 A1 * | 9/2003 | Miyoshi ............ 280/735 |

FOREIGN PATENT DOCUMENTS

| | | |
|---|---|---|
| JP | 9123876 | 8/1997 |
| JP | 10250642 | 9/1998 |
| JP | 2000006854 | 1/2000 |
| KR | 1998-080744 | 11/1998 |

* cited by examiner

*Primary Examiner*—Gary Chin
(74) *Attorney, Agent, or Firm*—Townsend and Townsend and Crew LLP

(57) ABSTRACT

A vehicle drive recorder is provided for recording a signal onto a hard disk, such signal obtained while vehicle is in operation. The recorder inhibits data recording upon receipt of an inhibit signal. Inhibit canceling signal is also available.

18 Claims, 5 Drawing Sheets

VEHICLE DRIVE RECORDER

CROSS-REFERENCES TO RELATED APPLICATIONS

This application claims priority to Japanese Patent Application No. 2002-272694, filed Sep. 19, 2002, the entire disclosure of which is incorporated by reference.

BACKGROUND OF THE INVENTION

The present invention relates to a magnetic disk drive, and more particularly, to a magnetic disk to be used in a vehicle for recording the condition of such vehicle.

There are various ways for placing a recorder in a vehicle and recording the condition of the vehicle, such as the driver's driving operations and the movement of the vehicle. For example, disclosed in Japanese published application JPA 9-123876, the prior art ensures the driver's privacy and at the same time permits a public institution to exercise fair management of recordings by using an optical disk, magnetic disk, or other recorder is used to record the vehicle's conditions. The prior art causes the recorder to start a recording operation upon input of a first code number, which is unique to the driver. And, reading and erasing the recorded data is permitted only upon input of a second code number, which is not open to the public and is managed by the public institution.

The aforementioned prior art discloses a system that ensures the driver's privacy and permits a public institution to exercise fair management of recordings. This can be obtained by stopping recordings when the vehicle is involved into something unusual. And then reading or erasing the recorded data will be inhibited, unless the second code number is entered. However, the patent document merely states that the recording of the vehicle's data will be terminated when the vehicle is damaged or otherwise rendered extraordinary. However, the document does not disclose how it will be practiced.

Accordingly, what is needed is a magnetic disk drive that stops the vehicle signal recording operation in the event of a vehicle disorder or other incidents.

BRIEF SUMMARY OF THE INVENTION

In a preferred embodiment, the invention provides a magnetic disk drive capable of enabling/inhibiting recording information.

In accordance with one aspect of the present invention, a drive recorder records a signal onto a hard disk while the vehicle is in operation. The drive recorder comprises an input section for receiving a signal detected by a sensor mounted in a vehicle and a storage control section for recording a signal transmitted via the input section onto the hard disk. The storage control section includes inhibit signal generator for generating a signal for blocking information from being recorded onto the hard disk. When a vehicle disorder signal is entered into the input section, the inhibit signal generator generates an inhibit signal in order to block a signal detected by a sensor from being recorded onto the hard disk.

More specifically, the storage control section includes a temporary storage section for temporarily storing a signal transmitted via the input section and a timer for counting the time, the storage control section records the association between the information stored in the temporary storage section and the timer count on the hard disk. When a vehicle disorder signal is entered into the input section, the inhibit signal generator generates a write protection signal to block the information stored in the temporary storage section from being recorded onto the hard disk.

In case when a magnetic hard disk drive is implemented as such recorder, a write protection signal could be used as the inhibit signal, which is to be generated by the inhibit signal generator. When the write protection signal is effectively used, it prevents a vehicle signal from being recorded onto the hard disk.

For example in one embodiment, the signal for activating an airbag is used as the aforementioned vehicle disorder signal. The airbag activation signal is entered into the input section as the disorder signal.

According to another aspect of the embodiment, it is also possible to provide a switch in the information transmission signal path between the recording control section and hard disk, and substantially turn off the switch by a signal from the inhibit signal generator. Other aspects and advantages of the present invention will become apparent from the following detailed description, which, when taken in conjunction with the drawings, illustrate by way of example the principles of the invention.

DETAILED DESCRIPTION OF THE INVENTION

As shown in the figures for purposes of illustration and described in detail in this section, the invention is embodied in a recording system that inhibits/re-enables recording thereof.

Figure 1:
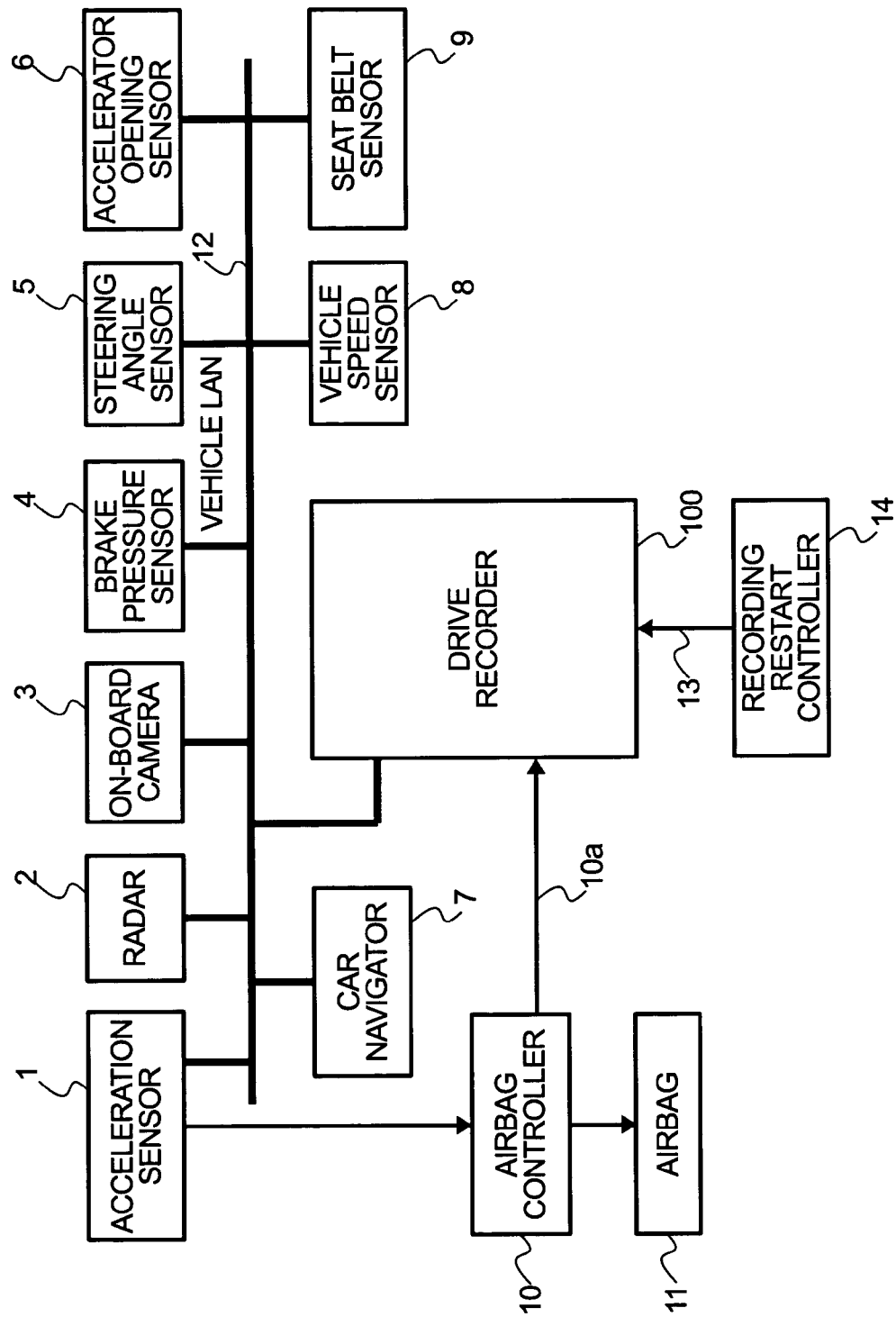
FIG. 1 is a block diagram illustrating a vehicle recording system according to one embodiment of the present invention.

FIG. 1 is a block diagram that illustrates a vehicle recording system according to one embodiment of the present invention. An acceleration sensor 1 shown in this figure measures the acceleration/deceleration of a vehicle. A radar 2 measures the following distance to another vehicle, relative speed, and others. An on-board camera 3 images the outside and inside of the vehicle and forwards a video signal. A brake pressure sensor 4 detects the pressure applied to a brake pedal. A steering angle sensor 5 measures the angle through which a steering wheel is turned. A throttle sensor 6 measures the opened width of the throttle. A car navigator 7 determines the vehicle's location on a map. A vehicle speed sensor 8 measures the vehicle's speed. A seat belt sensor 9 detects whether a driver/passenger wears a seat belt. Each of these sensors, sensors 1 through 9, incorporates an intra-vehicle communication interface (illustrated is a LAN interface in the figure). The signals detected by sensors 1 through 9 are transmitted to a drive recorder 100 via a vehicle LAN 12. For example, in case the signal from the acceleration sensor 1 exceeds the predetermined level, an airbag controller 10 concludes that a collision has occurred, activates an airbag 11, and outputs an airbag operation signal to signal line 10a. The drive recorder 100 records a vehicle signal that is transmitted via the vehicle LAN 12.

A recording restart controller 14 is furnished for resuming a recording operation. This controller 14 re-enables the recording function of the drive recorder 100 by issuing a cancel signal 13 to the drive recorder 100. The recording restart controller 14 generates the cancel signal only when it receives PINs from an authorized person authorized to resume the recording operation. This cancel signal generation process is performed responsively when, for instance, an authorized person enters a code number from an input device which is not shown in the figure. In this manner, the recorded information can be protected against falsification. The cancel process performed by the cancel signal 13 will be described in detail hereinafter.

The recording operation performed by a vehicle signal will now be described. Sensors 1 through 9 transmit detected vehicle signals to the vehicle LAN 12 periodically, for example once in 100 ms. The drive recorder 100 receives the vehicle signals from sensors 1 through 9 via the vehicle LAN 12 and records them. If, in the meantime, an airbag operation signal is entered from signal line 10a, the drive recorder 100 concludes that some sort of disorder is encountered, and stops recording the signals from sensors 1 through 9.

Figure 2:
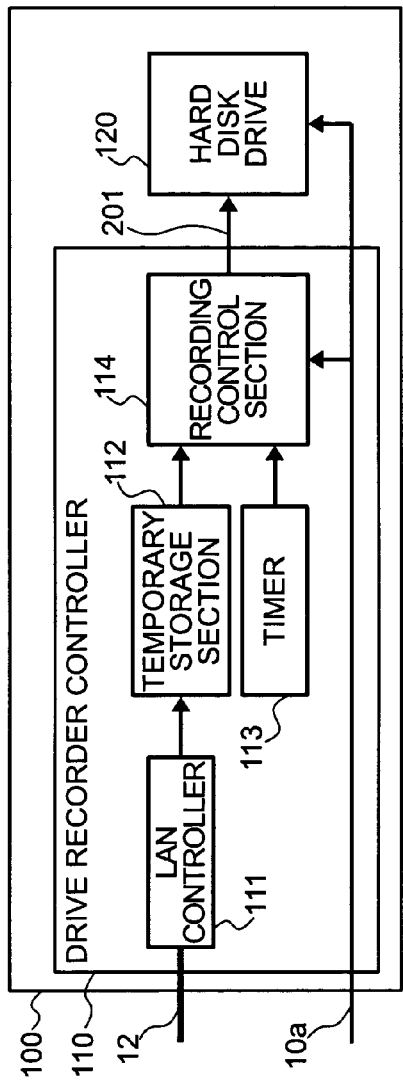
FIG. 2 is a block diagram illustrating the configuration of an in-vehicle drive recorder according to one embodiment of the present invention.

FIG. 2 is a block diagram illustrating the configuration of the drive recorder 100. In the example shown in this figure, a hard disk drive is used as the recording device for the drive recorder 100. The drive recorder 100 mainly consists of a drive recorder controller 110 and a hard disk drive 120. The drive recorder controller 110 comprises a LAN controller 111 for receiving a vehicle signal input via the vehicle LAN 12, a temporary storage section 112 for temporarily storing a vehicle signal, a timer 113 for measuring the time, and a recording control section 114 for controlling the recording operation of the hard disk drive 120. The process for canceling the record inhibit state will be described later with reference to FIG. 5.

The operation will now be described. The vehicle signals transmitted from sensors 1 through 9 via the vehicle LAN 12 are delivered to the LAN controller 111. These vehicle signals are then stored in the temporary storage section 112. The recording control section 114 receives a time signal from the timer 113, and outputs both the time signal and the vehicle signals, which are stored in the temporary storage section 112, to the hard disk drive 120 via an interface 201 at 100 ms intervals or other fixed time intervals. The hard disk drive 120 inputs the vehicle signals and the time from the recording control section 114 via the interface 201, and records them. Upon receipt of an airbag operation signal input from signal line 10a, the recording control section 114 issues a write protection signal to the hard disk drive 120 via the interface 201 in order to inhibit the hard disk drive 120 from making subsequent recordings.

Figure 3:
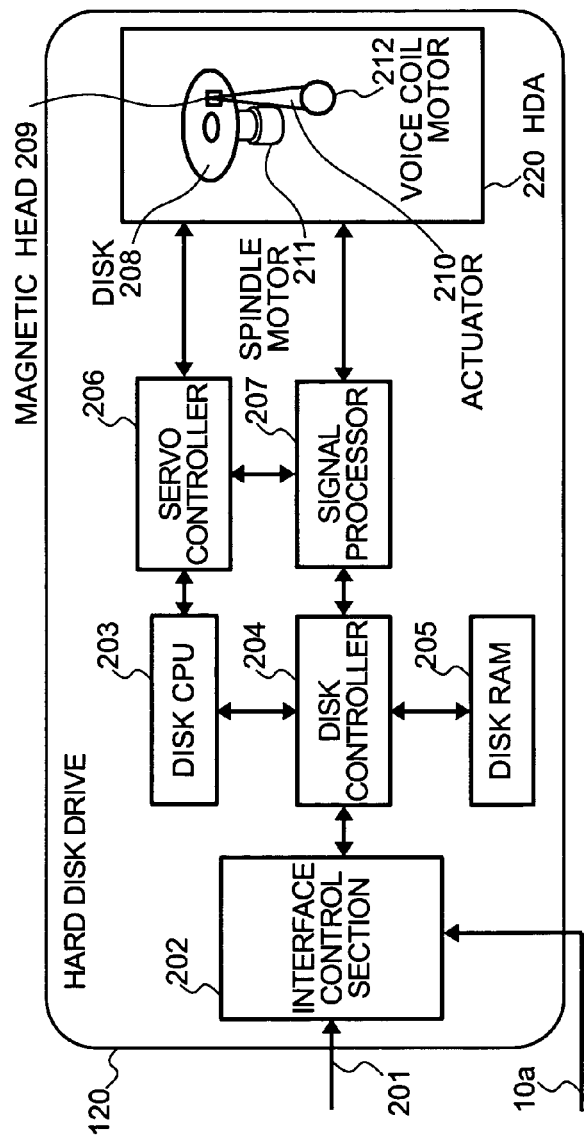
FIG. 3 is a block diagram illustrating the configuration of a hard disk drive for use with a drive recorder according to one embodiment of the present invention.

FIG. 3 shows a block diagram that illustrates the configuration of the hard disk drive 120. In the configuration shown in FIG. 3, the hard disk drive 120 includes a disk CPU 203, an interface control section 202, a disk controller 204, a disk RAM 205, a signal processor 207, a servo controller 206, and an HDA 220 (which stands for Head-Disk Assembly). The disk CPU 203 provides overall data processing control over the hard disk drive 120. The disk controller 204 controls the data transfer between the interface control section 202 and disk RAM 205 and the data transfer between the signal processor 207 and disk RAM 205. The signal processor 207 performs an encoding process, decoding process, and analog-to-digital conversion process on the signals to be recorded onto a disk 208 or played back.

The HDA 220 includes a disk 208, which is a recording medium for storing data, a spindle motor 211 for fixing the disk, a magnetic head 209, which serves as a read/write head, an actuator 210 for supporting the head, and a voice coil motor 212 for moving the actuator. The servo controller 206 controls the spindle motor 211 and voice coil motor 212. The interface control section 202 is connected to the drive recorder controller 110 via the interface 201 with the outside. For example, an ATA, IEEE1394, SSA, or Fiber Channel interface may be used as the interface 201. However, any interface can be used as far as it provides the communication between the hard disk drive 120 and the drive recorder controller 110, which works as a host device.

There are several alternative ways to stop the recording operation of the hard disk drive 120. For example, the recording operation can be stopped by issuing a write protect instruction via the interface 201. This instruction is one of many control commands that are commonly used in the hard disk drive 120. The operation shown in FIG. 3 will now be described. Upon receipt of an airbag activation signal input from signal line 10a, the drive recorder controller 110 issues a write protect instruction to the hard disk drive 120 via the interface 201. The write protect instruction is in turn transmitted to the disk CPU 203 via the interface control section 202 and disk controller 204. Upon receipt of the write protect instruction, the disk CPU 203 inhibits any subsequent disk recording operation.

Further, signal line 10a can also be routed to the interface control section 202 as shown in FIG. 3, and used to transmit the instruction for inhibiting a recording process. The operation for inhibiting a recording process will now be described. When airbag activating signal is transmitted to the hard disk drive 120 via signal line 10a, the airbag activating signal is transmit to the disk CPU 203 via the interface control section 202 and disk controller 204. Upon receipt of the airbag activating signal, the disk CPU 203 begins to block vehicle signals from being recorded onto disk 208.

Figure 4:
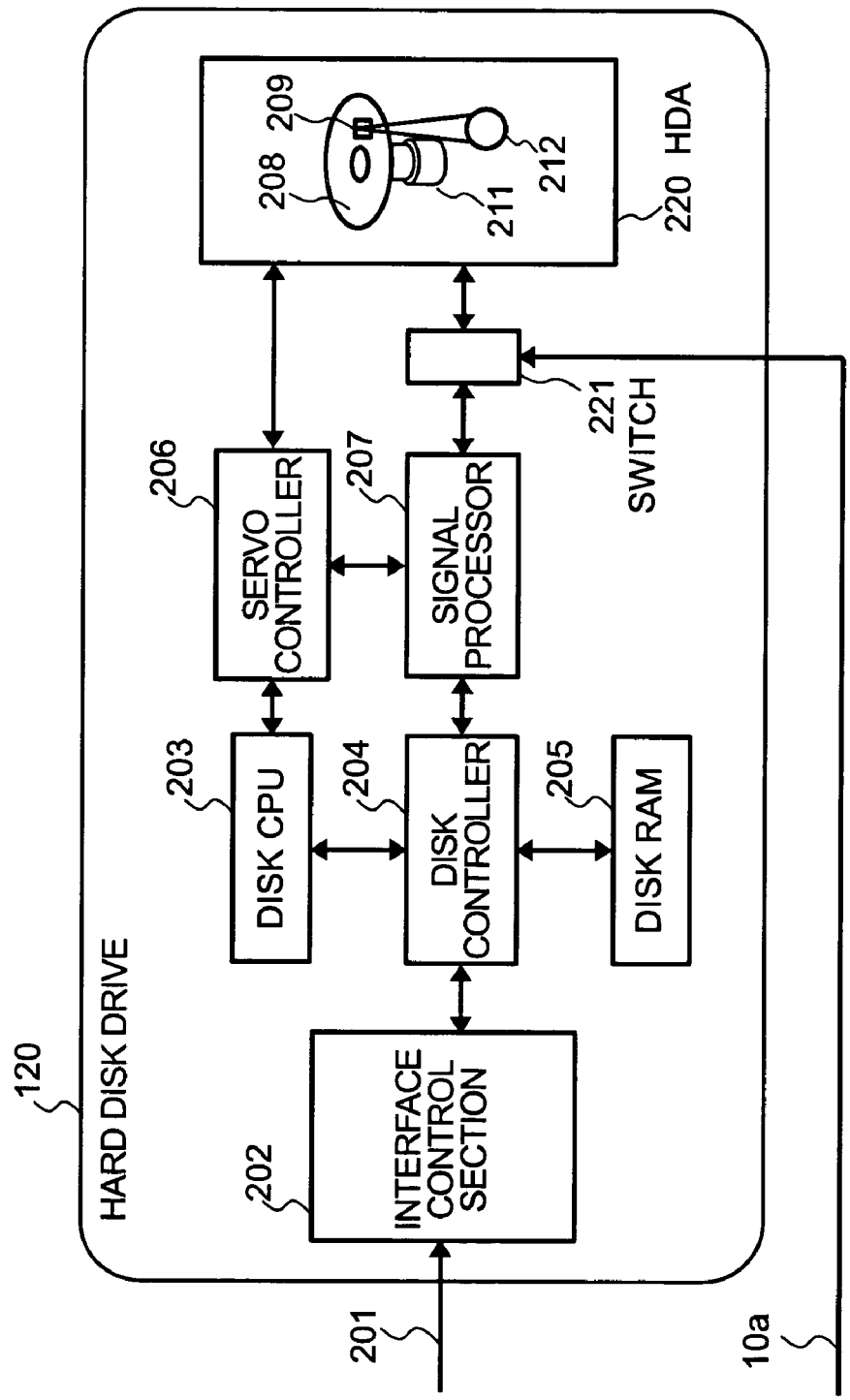
FIG. 4 is a block diagram illustrating the hard disk drive configuration for controlling the recording signal path according to another embodiment of the present invention.

As indicated by the example shown in FIG. 4, the signal line can be physically disconnected to inhibit the hard disk drive from performing a recording operation. In FIG. 4, switch 221 is used as a switch for providing on/off control over the signal line between the signal processor 207 and HAD 220. An analog switch may be used as switch 221. The circuit 221 is designed to open switch 221 when signal line 10a is at "high".

When the airbag is activated, signal line 10a is set to "high", so as to open switch 221, and in turn release the signal line between the signal processor 207 and HDA 220. Therefore, even if the signal from various sensors comes in via the interface control section 202, processed by the signal processor 207, and in turn transferred to HAD 220, such signal would not be written to the disk because the signal path is blocked by switch 221.

Although specific embodiments of the invention have been described and illustrated, one skilled in the art will recognize other embodiments, not expressly described, but which fall within the scope of the invention. For example, switch 221, which is shown in an embodiment shown in FIG. 4, may be replaced with a fuse. By using a fuse, the magnetic disk drive would not restore the signal path easily.

In this alternative embodiment, the same switching function can be implemented by using signal line 10a to deliver a fuse blowout signal, as is the case with switch 221.

Figure 5:
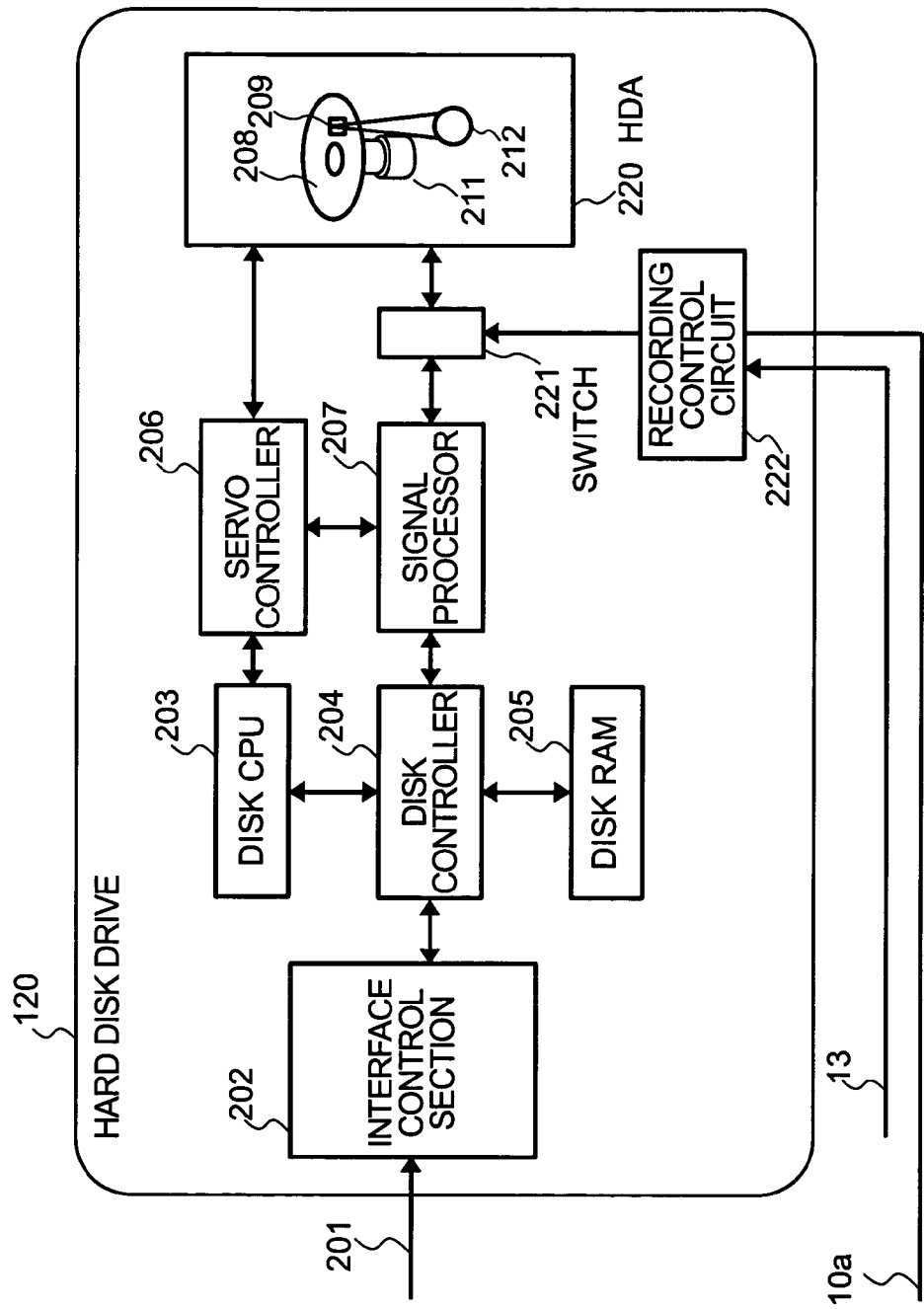
FIG. 5 is a block diagram that illustrates how to enable the recording function of a hard disk drive according to the embodiment shown in FIG. 4.

FIG. 5 is a block diagram that illustrates a configuration in which circuitry that releases "write inhibit state" and re-enables the recording function of the hard disk drive shown in FIG. 4 is provided additionally. A recording control circuit 222 is added to switch 221, and signal lines 10a and 13 are connected to the recording control circuit 222.

Figure 6:
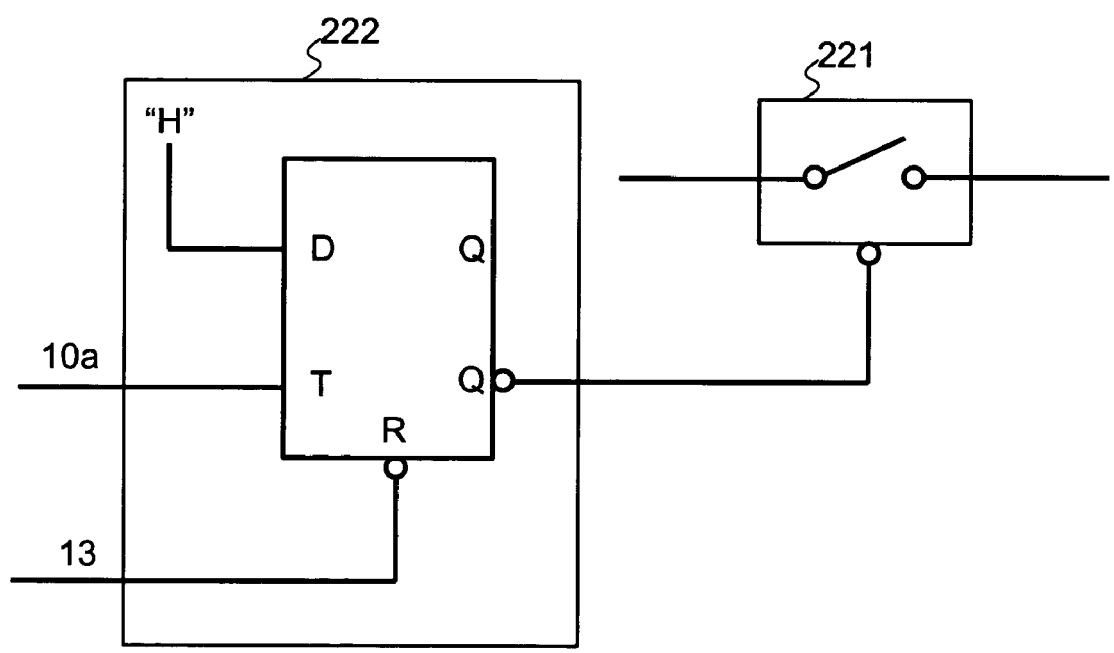
FIG. 6 is a circuit diagram illustrating one example of a recording control circuit 222.

FIG. 6 shows the details of the recording control circuit 222 and switch 221. The recording control circuit 222 may consist of a latch circuit. When a signal is entered from signal 10a while the latch circuit's terminal D is fixed at a logical high (H) level, the output terminal Q goes High (H). The configuration indicated in the figure presumes that switch 221 closes when the reverse signal of terminal Q goes Low (L). Switch 221 opens, when the latch circuit's reset terminal (R) is set to "low". While the power of the device itself is turned off, switch 221 is opened so that the recording function is disabled. On the contrary, the switch may remain closed while the power is off in an alternate embodiment. However, it is conceivable that power supply may be impossible in case of a serious damage. It is therefore desirable that the recording function be disabled while the power is off.

The foregoing embodiments of the present invention is embodied implementing a HDD. As an alternative, an optical disk may be adopted. Further, the present invention is applicable not only to automobiles but also to trains, ships, airplanes, and other vehicles.

From the foregoing it will be appreciated that inhibiting/enabling of the HDD recording is achieved in a simple manner.

From the foregoing, it will be appreciated that in case of any disorder of a vehicle, it blocks the hard disk drive from recording information onto a hard disk and updating the information stored on the hard disk.

What is claimed is:

1. A vehicle recorder comprising:
   a disk drive configured to record vehicular information;
   a recording controller configured to control recording operation of the disk drive; and
   an interface controller configured to control data transfer between the recording controller and the disk drive;
   wherein the disk drive comprises a processor configured to process data from the recording controller and output the processed data; a head disk assembly configured to record the processed data; and a switch configured to provide on/off operation on transfer of the processed data between the processor and the head disk assembly;
   wherein the on/off operation of the switch is controlled by a first control signal and a second control signal;
   wherein the first control signal is a control signal output from a vehicle disorder signal source of a vehicle for enabling the switch to transfer the processed data, and the second control signal is a control signal output from a recording restart controller of the vehicle for disabling the switch to transfer the processed data.

2. The vehicle recorder according to claim 1, wherein the switch is positioned between the processor and the head disk assembly.

3. The vehicle recorder according to claim 1, further comprising a control signal line connecting the recording controller to the switch.

4. The vehicle recorder according to claim 1, wherein the first control signal is an air bag operation signal output from an airbag controller of the vehicle.

5. The vehicle recorder according to claim 1, wherein the disk drive further comprises a controller configured to output a control signal to the switch for controlling the on/off operation of the switch.

6. The vehicle recorder according to claim 5, further comprising a control signal line connecting the recording controller to the controller.

7. The vehicle recorder according to claim 5, wherein the controller is controlled by the first control signal transmitted over a first control signal line and the second control signal transmitted over a second control signal line.

8. The vehicle recorder according to claim 1, wherein the second control signal is an authorized signal output from the recording restart controller outside the vehicle recorder.

9. The vehicle recorder according to claim 1, wherein the processor performs encoding process, and analog to digital conversion process.

10. The vehicle recorder according to claim 1, wherein the first control signal is output to the switch when the vehicle disorder signal source detects a signal exceeding a predetermined level.

11. The vehicle recorder according to claim 10, wherein the signal exceeding the predetermined level is output from an acceleration sensor.

12. The vehicle recorder according to claim 1, wherein the second control signal is output when the recording restart controller receives an authorized signal.

13. A vehicle recorder comprising:
   a processor configured to process input vehicular data and output the processed data;
   a head disk assembly configured to record the processed data;
   a switch configured to provide on/off operation on transfer of the processed data between the processor and the head disk assembly;
   wherein the on/off operation of the switch is controlled by a first control signal received from a first controller and a second control signal received from second controller, wherein the first control signal is a control signal for enabling the switch to transfer the processed data, and wherein to second control signal is a control signal for disabling the switch to transfer the processed data;
   wherein the first control signal is a control signal output from a vehicle disorder signal source of a vehicle and the second control signal is a control signal output from a recording restart controller of the vehicle.

14. The vehicle recorder according to claim 13, wherein the switch is positioned between the processor and the head disk assembly.

15. The vehicle recorder according to claim 13, wherein the first controller outputs the first control signal to the switch when the first controller detects a signal exceeding a predetermined level.

16. The vehicle recorder according to claim 15, wherein the signal exceeding the predetermined level is output from an acceleration sensor.

17. The vehicle recorder according to claim 13, wherein the first controller is an airbag controller.

18. The vehicle recorder according to claim 13, wherein the second controller outputs the second control signal when receiving an authorized signal.

* * * * *